United States Patent
Petersen et al.

(10) Patent No.: US 9,065,287 B2
(45) Date of Patent: Jun. 23, 2015

(54) RECHARGING ENERGY STORAGE CELLS USING CAPACITIVE STORAGE DEVICE

(75) Inventors: Eric G. Petersen, Beaverton, OR (US); Robert J. Wood, Syracuse, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 513 days.

(21) Appl. No.: 13/464,717

(22) Filed: May 4, 2012

(65) Prior Publication Data

US 2013/0119945 A1 May 16, 2013

Related U.S. Application Data

(60) Provisional application No. 61/483,108, filed on May 6, 2011.

(51) Int. Cl.
*H02J 7/00* (2006.01)
*H02J 7/34* (2006.01)

(52) U.S. Cl.
CPC ............ *H02J 7/0052* (2013.01); *H02J 7/0044* (2013.01); *H02J 7/008* (2013.01); *H02J 7/345* (2013.01)

(58) Field of Classification Search
CPC ............................... H02J 7/345; Y02E 60/13
USPC ........................................................ 320/167
See application file for complete search history.

(56) References Cited

U.S. PATENT DOCUMENTS

| | | |
|---|---|---|
| 4,609,861 A | 9/1986 | Inaniwa et al. |
| 5,717,311 A | 2/1998 | Im et al. |
| 6,094,033 A | 7/2000 | Ding |
| 2003/0080712 A1 | 5/2003 | Tamura et al. |
| 2003/0102845 A1 | 6/2003 | Aker et al. |
| 2004/0251880 A1 | 12/2004 | O'Brien |
| 2004/0263129 A1 | 12/2004 | Thrap |
| 2008/0258674 A1 | 10/2008 | Hui et al. |
| 2008/0315829 A1* | 12/2008 | Jones et al. .................. 320/103 |
| 2009/0096430 A1 | 4/2009 | Van Der Linde et al. |
| 2010/0007307 A1 | 1/2010 | Baarman et al. |
| 2010/0182075 A1 | 7/2010 | Yang et al. |
| 2010/0225283 A1 | 9/2010 | Hsia et al. |
| 2013/0106363 A1* | 5/2013 | Seman et al. ................. 320/137 |

FOREIGN PATENT DOCUMENTS

| | | |
|---|---|---|
| WO | WO 2006/060391 | 6/2006 |
| WO | WO 2008/093170 | 8/2008 |

OTHER PUBLICATIONS

U.S. Appl. No. 13/102,108, filed May 5, 2011, 16 pages.
Isaacson, M.J. et al., Advanced lithium ion battery charger, 2000, pp. 193-198.
Li, Pengfei et al., A wireless power interface for rechargeable battery operated medical implants, Oct. 2007, pp. 912-916.
Dirjish, Matt, Ultracapacitors branch out into wider markets, Nov. 17, 2008.
Simjee, F.I. et al., Efficient charging of supercapacitors for extended lifetime of wireless sensor nodes, May 2008, pp. 1526-1536.

* cited by examiner

*Primary Examiner* — Suresh Memula
(74) *Attorney, Agent, or Firm* — Merchant & Gould P.C.

(57) ABSTRACT

A handheld device includes a capacitive storage device and energy storage cells. The capacitive storage device can be rapidly charged. The energy from the capacitive storage device is used to recharge the energy storage cells over a longer period of time.

18 Claims, 6 Drawing Sheets

RECHARGING ENERGY STORAGE CELLS USING CAPACITIVE STORAGE DEVICE

CROSS-REFERENCE TO RELATED APPLICATION

This application claims priority to U.S. Provisional Application Ser. No. 61/483,108 filed on May 6, 2011, entitled RECHARGING ENERGY STORAGE CELLS USING CAPACITIVE STORAGE DEVICE, the disclosure of which is hereby incorporated by reference in its entirety.

BACKGROUND

Healthcare providers, such as doctors and nurses, frequently use handheld devices when providing healthcare. Many of these handheld devices include electrical devices that must be powered by electricity. One example of such a handheld device is an otoscope, which includes a light to illuminate a patient's ear canal during an examination. Another example of a handheld device is a clinical notifier operating on a mobile computing device.

Batteries can be used to power handheld devices, and rechargeable batteries permit repeated use of the same batteries. The batteries can be recharged with a battery charger, but the charging process can take a significant amount of time. During this time, the handheld device may not be available for use, or an alternative power source, such as a replacement battery or power cord, may need to be used.

SUMMARY

In general terms, this disclosure is directed to a power supply including a capacitive storage device and energy storage cells. In one possible configuration and by non-limiting example, the capacitive storage device can be rapidly charged by an external power source. The capacitive storage device is then used to recharge energy storage cells over a period of time.

One aspect is a device comprising an electrically powered device; one or more energy storage cells configured to store energy and electrically coupled to the electrically powered device to supply energy to the electrically powered device; a capacitive storage device configured to receive and store energy from an external power source; boost circuitry configured to boost a voltage from the capacitive storage device; and a charging circuit configured to receive energy having a boosted voltage and to recharge the storage cells using the energy having a boosted voltage.

Another aspect is a method of charging energy storage cells of an electrically powered device, the method comprising: connecting an electrically powered device to an external power source; charging a capacitive storage device of the electrically powered device using the power; boosting a voltage from the capacitive storage device; and charging the energy storage cells using the boosted voltage.

Yet another aspect is an electronic device comprising: one or more electronic devices requiring electrical power in order to perform one or more intended functions; and electronic power supply circuitry configured to store and to deliver the electrical power to the one or more electronic devices, wherein the electronic power supply circuitry comprises: charging interface circuitry including electrical contacts arranged and configured to receive energy from a charging station; a capacitive storage device comprising at least one capacitor electrically coupled to the charging interface circuitry to receive the energy from the charging interface when the charging interface is connected to the charging station; voltage boost circuitry electrically coupled to the capacitive storage device, and arranged and configured to generate an output having a substantially constant output; a charging circuit electrically coupled to the voltage boost circuitry to receive the output; energy storage cells electrically coupled to the charging circuit, wherein the charging circuit operates to recharge the energy storage cells using the energy stored in the capacitive storage device; and output interface circuitry electrically coupled to the energy storage cells to deliver energy from the energy storage cells to the one or more electronic devices.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
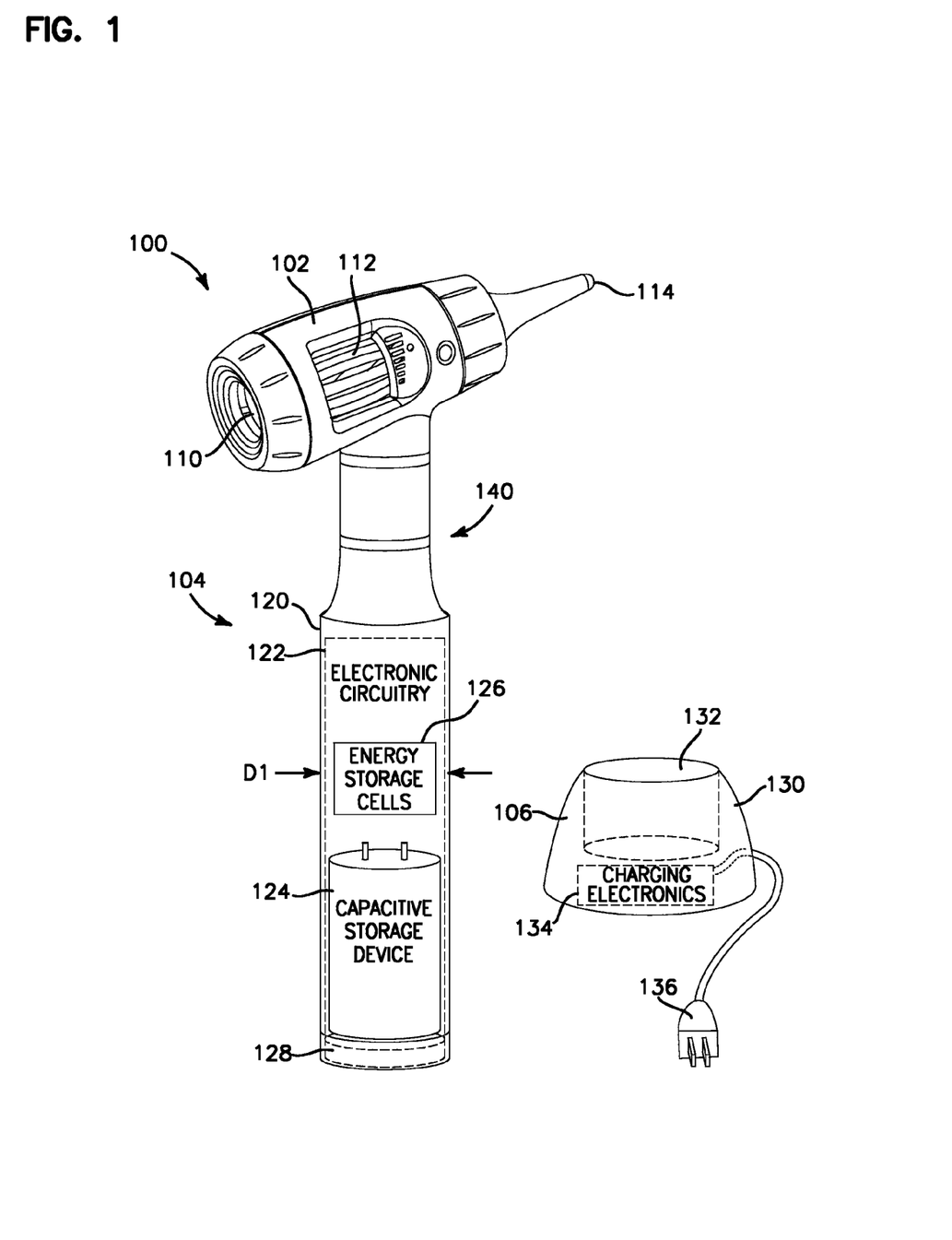
FIG. 1 is a schematic perspective view of an example handheld device.

FIG. 1 is schematic perspective view of an example handheld device 100. In this example, the handheld device 100 includes an instrument 102 and a power handle 104. Some embodiments further include a charging station 106 for recharging the handheld device 100.

An example of instrument 102 is an otoscope, which includes an adjustable optics assembly 110, an adjustment control 112, and a light source 114. An otoscope can be used by a healthcare provider during a patient encounter to view inside a patient's ear canal. To do so, the healthcare provider inserts the end of the otoscope into the ear canal, where it is illuminated by the light source 114. The healthcare provider then looks through the optics assembly 110 and adjusts the focus, if necessary, using the adjustment control 112. As discussed below, the light source is powered by the power handle 104. Power is transferred through conductors within the instrument.

A wide variety of instruments 102 can be used in other embodiments. In some embodiments, the instrument 102 is a medical examination instrument, such as an otoscope, an ophthalmoscope, a thermometer, a sphygmomanometer, a skin surface microscope, a unidirectional occluder, an examination light, an electronic stethoscope, a tympanometric instrument, an audiometer, or a variety of other medical examination instruments. In other embodiments, the instrument 102 is a therapeutic device, such as a surgical instrument, a drug delivery or measurement instrument, or other therapeutic devices. Although exemplary embodiments are described as handheld medical devices, other embodiments are possible, such as non-handheld devices, or non-medical devices. Instrument 102, including light source 114, is an example of an electronic device. Other embodiments include electrically powered devices, which include electronic devices, electromechanical devices (e.g., a saw or a drill), and electroluminescent devices. In some embodiments the instrument 102 is a medical drill, a medical saw, an illumination device, a flashlight, a power tool, or a wide variety of other possible instruments.

The power handle 104 forms a handle for the handheld device 100, and is sized to be held in the hand of the healthcare provider. In this example, the power handle 104 includes a housing 120 and electronic circuitry 122 within the housing 120. The electronic circuitry 122 includes, for example, one or more capacitive storage devices 124, one or more energy storage cells 126, and charging interface circuitry 128.

In an alternative embodiment, device 100 includes an energy source pack that is separate from the handle. Some embodiments of device 100 do not include a handle.

The housing 120 is, in some embodiments, sized and configured to be held by a hand of a healthcare provider. The housing 120 is typically formed of materials such as metal or plastic, and forms a protective enclosure for the electronic circuitry 122 contained within the housing 120.

In some embodiments, the housing 120 has a cross-sectional dimension D1 sized to fit within a hand of a healthcare provider. In one example, the dimension D1 is in a range from about 0.5 inches to about 4 inches. In another example, the dimension D1 is in a range from about 0.5 inches to about 3 inches. In yet another example, the dimension D1 is about one inch. In some embodiments, dimension D1 is less than about 4 inches, 3 inches, or 2 inches. In some embodiments, at least a portion of the housing has a cylindrical shape, in which case the dimension D1 is the diameter of the housing.

In some embodiments, the housing 120 of the power handle 104 is sealed. Because no batteries are included in some embodiments of the power handle 104, the housing 120 does not require any doors or other openings, other than at the interface 140. A sealed housing 120 reduces the chance of water or other liquid or particle intrusion into the interior of housing 120. A sealed housing 120 is also easier to clean and sanitize.

In some embodiments, the electronic circuitry 122 includes a capacitive storage device 124 and energy storage cells 126. The capacitive storage device 124 receives power from the charging station 106 through the charging interface circuitry 128, to rapidly charge the capacitive storage device. Once charged, the device 100 can be removed from the charging station 106. The capacitive storage device 124 then supplies power to the energy storage cells, such as through a charging circuit described in more detail herein, to recharge the energy storage cells 126 over a longer duration of time. In some embodiments, the device 100 can continue to be used while the energy storage cells 126 are being charged by the capacitive storage device 124.

In some embodiments, the capacitive storage device 124 is a capacitor, such as a super capacitor (sometimes alternatively referred to as an ultra capacitor or a pseudo capacitor), which can store a large amount of electrical energy. In some embodiments, the capacitor includes a high capacitance, a high energy density, and/or a high power density. In some embodiments, the super capacitor has a capacitance of greater than about 100 F. Some embodiments have a power density of greater than 1,000 W/kg. Some embodiments have an energy density in a range from about 1 Wh/kg to about 10 Wh/kg. In some embodiments, the capacitive storage device 124 is an electric double layer capacitor (EDLC).

In some embodiments, the capacitive storage device 124 is an electrochemical capacitor that has a high energy density when compared to common capacitors, typically on the order of thousands of times greater than a high capacity electrolytic capacitor. For example, a typical D-cell sized electrolytic capacitor may have a capacitance in the range of tens of milli-Farads. The same size electric double-layer capacitor may have a capacitance of several farads, an improvement of about two or three orders of magnitude in capacitance, but may have a lower working voltage.

One example of a super capacitor is the pseudo electrochemical double layer capacitor distributed by Ioxus, Inc. of Oneonta, N.Y. These include the 220 F. model (Part No. RHE2R3227SR) having a power density of about 2.65 kW/kg and an energy density of about 6.47 Wh/kg, the 800 F. model (Part No. RHE2R3807SR) having a power density of about 1.82 kW/kg and an energy density of about 6.46 Wh/kg, and the 1000 F. model (Part No. RHE2R3108SR) having a power density of about 1.57 kW/kg and an energy density of about 6.12 Wh/kg. Two or more capacitors are combined to achieve the desired characteristics, in some embodiments.

Energy storage cells 126 store energy to power instrument 102, or other electronic devices of the handheld device 100. An example of energy storage cells 126 is a battery, or set of one or more batteries. A variety of different types of energy storage cells 126 can be used, such as lithium cells. A specific example includes a battery pack including multiple (e.g., three) 3.6 volt lithium cells. Other embodiments include other battery packs, other quantities or types of lithium cells, or other types of energy storage cells. A benefit of using energy storage cells 126, is that the energy stored within the cells can be maintained for a relatively long period of time, such as when the device 100 is not in use. The energy retention period is typically greater than that of the capacitive storage device 124. In an example embodiment, when device 100 is not in use to supply power to a load (such as light source 114), the energy retention period is one year or more.

The charging interface circuitry 128 is included in some embodiments to receive power from the charging station 106 and to deliver the power to the capacitive storage device 124. The charging interface circuitry can include, for example, charging terminals for receiving power through electrical contacts of the charging station 106.

Additional charging interface circuitry 128 can be included, such as a fuse, a rectifier diode, filtering electronics, electrostatic discharge prevention circuitry, and other charging electronics (such as regulators, inductors, capacitors, a charge status indicator, etc.) can be used to control, monitor, or filter power delivery to the capacitive storage device 124.

A capacitor's voltage decays rapidly over time. As a result, the electronic circuitry 122 includes circuitry, in some embodiments, that boosts the voltage to a desired level. Examples of the electronic circuitry 122 are described in more detail with reference to FIG. 2.

Figure 5:
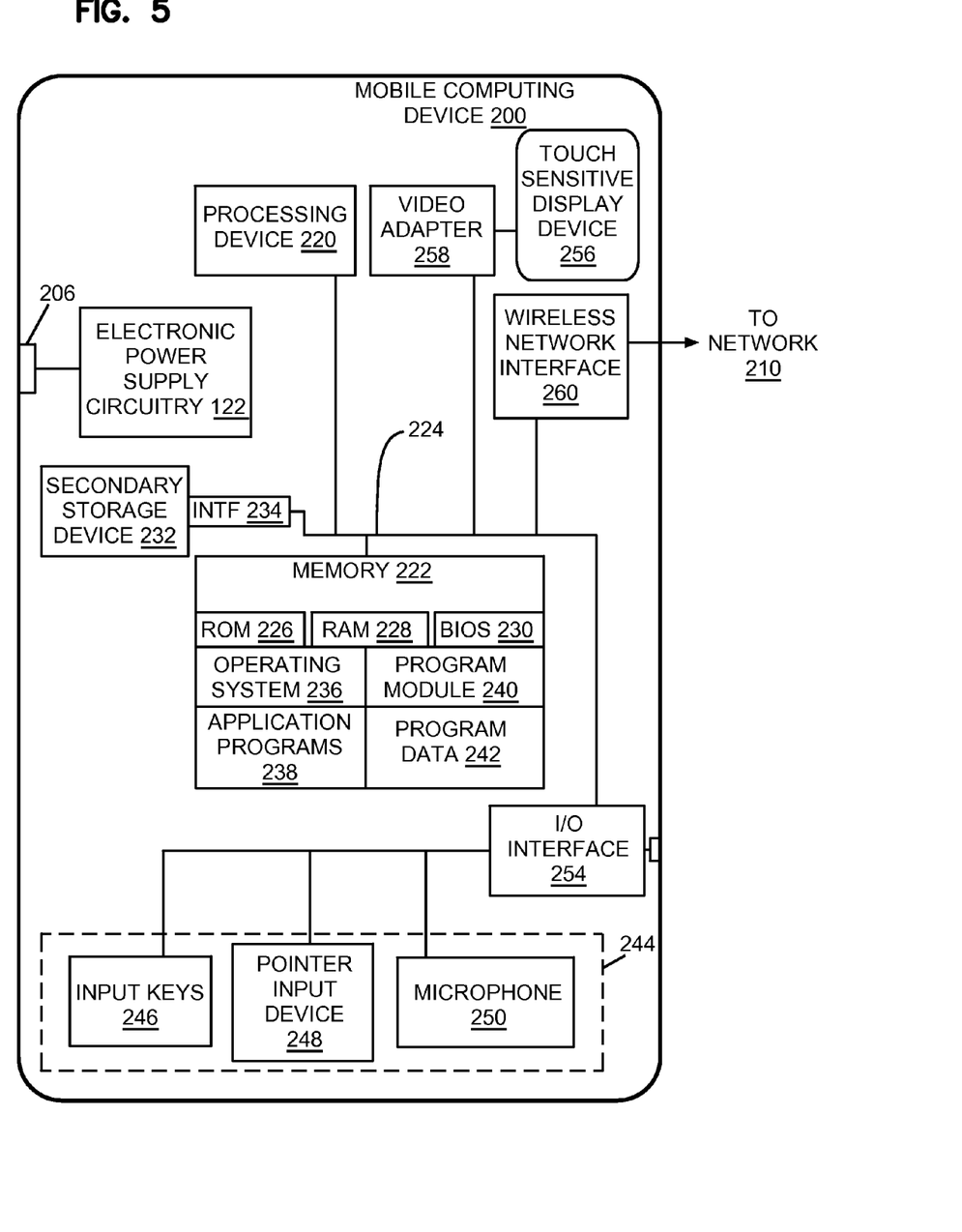
FIG. 5 is a schematic block diagram of the mobile computing device shown in FIG. 3.

The charging station 106 is provided to transfer power from a power source, such as a wall receptacle, to the handheld device 100. The charging station 106 includes a housing 130, such as made of plastic, including a receptacle 132 for receiving the handheld device 100 when not in use. Electrical contacts are provided in some embodiments to receive energy from the charging station 106. In another possible embodiment, the charging station 106 is a power cable configured for connection to a port 206 (such as shown in FIG. 5) of the device 100.

The housing 130 also forms a protective enclosure for charging electronics 134. The charging electronics 134 receive power from a wall receptacle or other power source, through the power cable 136, and converts the power into a form that can be transferred to the handheld device 100. For example, the charging electronics 134 can include an alternating current ("AC") to direct current ("DC") converter for converting the AC from the wall receptacle to a lower voltage DC signal.

In some embodiments the charging electronics include electrical contacts that are shaped to make a direct electrical connection with electrical contacts on the power handle 104 for direct power transfer. In another possible embodiment, the charging electronics 134 include a coil for inductively transferring power to the power handle 104. In some embodiments, the charging electronics 134 includes a constant wattage circuit, which provides energy at a rate equal to the maximum available DC power. As an example, the maximum available DC power is in a range from about 1 W to about 100 W. In another embodiment, the maximum available DC power is about 50 to 60 W. Other embodiments have other maximum available DC power values.

In some embodiments the instrument 102 is connected to the power handle 104 at an interface 140. The interface typically includes a mechanical interface, such as mating screw threads, or a snap together connection, and also an electrical interface to transfer power from the power handle 104 into the instrument 102. In some embodiments the instrument 102 can be disconnected from the power handle 104 at the interface. A common interface 140 design can be used in a variety of different types of instruments, to permit a single configuration of power handle 104 to be used with multiple different types of instruments. In other possible embodiments, however, instrument 102 is a single device that includes the components of the power handle 104 within the housing of instrument 102, rather than within a separate power handle.

Figure 2:
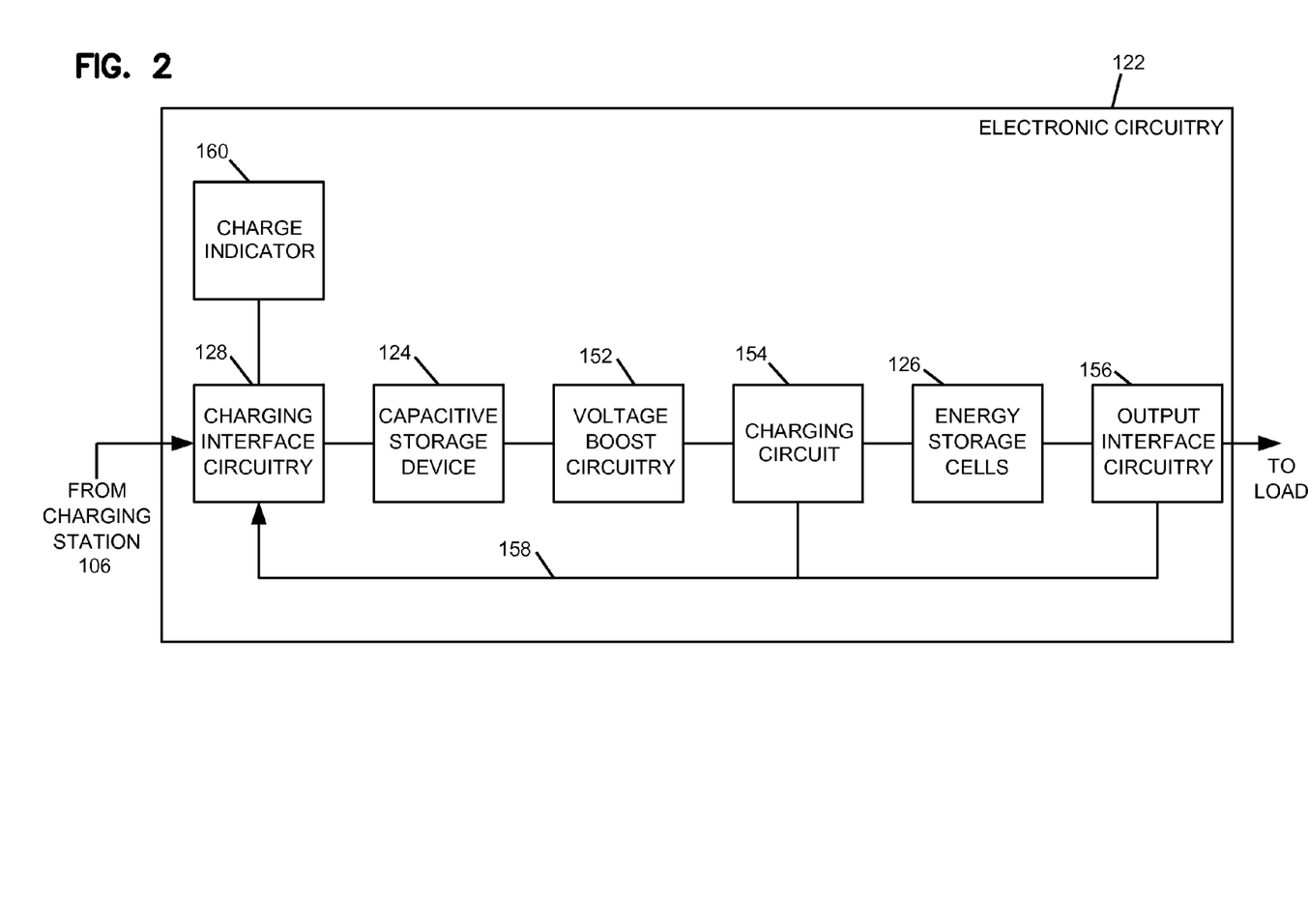
FIG. 2 is an electrical block diagram of electronic circuitry of the example handheld device shown in FIG. 1.

FIG. 2 is an electrical block diagram illustrating an example of the electronic circuitry 122. As shown in FIG. 1, the example handheld device 100 includes electronic circuitry 122 including a capacitive storage device 124, energy storage cells 126, and charging interface circuitry 128. In addition, in this example, the electronic circuitry further includes voltage boost circuitry 152, charging circuit 154, and output interface circuitry 156, feedback 158, and charge indicator 160.

Energy storage cells 126 are the primary energy storage devices of the electronic circuitry 122, and are typically used to power the device 100 during normal operation. When the energy in the energy storage cells 126 has been sufficiently depleted, the voltage may drop below a minimum operating voltage necessary for effective use of the device 100, requiring the energy storage cells 126 to be recharged for continued operation of device 100.

The device 100 can then be placed into a charging station 106, shown in FIG. 1, which supplies power to charging interface circuitry 128. The charging interface circuitry 128 includes, in some embodiments, input protection circuitry. An example of input protection circuitry is a rectifier diode that prevents the capacitive storage device 124 from discharging to the charging terminals. Some embodiments further include a charge indicator device, such as one or more LEDs. The charge indicator device generates a visible indication of the charge status, such as red when the energy storage cells 126 are getting low and green when the energy storage cells are charged.

The power received by charging interface circuitry 128 is then provided to capacitive storage device 124. In some embodiments, power is received at a rate of 50-60 watts, or more, which can charge the capacitive storage device 124 very rapidly, such as in a range from about 15 seconds to about 60 seconds. In some embodiments, the capacitive storage device 124 can be fully charged in less than 60 seconds, or less than 30 seconds. The device 100 can then be removed from charging station 106.

Voltage boost circuitry 152 is provided in some embodiments to provide a substantially constant voltage output from the variable voltage available from the capacitive storage device 124. As the energy from the capacitive storage device 124 is used, the voltage across the capacitive storage device 124 decreases. The voltage boost circuitry boosts the voltage to a desired level, to provide a substantially constant voltage output to the charging circuit 154. An example of voltage boost circuitry is described in co-pending U.S. patent application Ser. No. 13/102,108, by Robert J. Wood, filed on May 6, 2011, and titled CAPACITIVE POWER SUPPLY FOR HANDHELD DEVICE, the disclosure of which is hereby incorporated by reference in its entirety.

Charging circuit 154 is electrically coupled between the voltage boost circuit and the energy storage cells 126 to manage the charging of energy storage cells 126. One example of charging circuit 154 is an application-specific integrated circuit that is programmed to supply energy to the energy storage cells according to predetermined criteria. An example criterion of the predetermined criteria is a maximum rate of power delivery. In this example, the application-specific integrated circuit adjusts an actual rate of power delivery to maintain the actual rate below the predetermined maximum rate. Other criteria are used in other embodiments.

The energy storage cells 126 store energy. In one example, the energy is stored as chemical energy in electrochemical cells, which can then convert the chemical energy into electrical energy for delivery to a load. An example of an energy storage cell is a battery. The energy storage cells 126 are rechargeable, so that once the energy contained in the cells 126 has been partially or fully depleted, energy can be reapplied to the cells 126 to restore the energy.

Some embodiments utilize energy storage cells 126 instead of capacitive storage devices 124 as the primary power storage device because the energy storage cells 126 can typically maintain energy for a longer period of time with less leakage. Where a capacitive storage device 124 may only be able to maintain a charge for a relatively short period of time (e.g., days), the energy storage cells 126 can typically store energy for a longer period of time (e.g., months). If a device 100 draws relatively little power, or remains unused for a period of time, the energy storage cells 126 can continue to store the energy over a greater period of time so the device 100 remains operational when needed.

Output interface circuitry 156 is electrically coupled between the energy storage cells 126 and a load. In some embodiments, the output interface circuitry 156 manages the discharge of the energy storage cells 126 to protect the cells and prevent or reduce the chance of damaging the energy storage cells 126 as the cells are discharged.

Some embodiments further include feedback 158. As one example, feedback 158 provides a signal from the charging circuit 154 back to the charging interface circuitry 128. Because the charging circuit 154 operates in some embodiments to monitor the charge on the energy storage cells 126, the feedback 158 can be provided back to the charging interface circuitry 128 to inform the charging interface circuitry 128 of the status of the energy storage cells 126. In some embodiments, the charging circuit 154 and the output interface circuitry 156 generate pulses for each milli-Watt of power that passes therethrough, and charging interface circuitry 128 includes counters that monitor the energy usage. Analog or other digital signals are passed as feedback 158 in other embodiments.

In some embodiments, the charging circuit 154 monitors the quantity of energy provided to energy storage cells 126, and provides a signal to charging interface circuitry 128 identifying or representative of this quantity. Similarly, the output interface circuitry 156 monitors the quantity of energy provided to the load, and provides a signal to charging interface circuitry 128 identifying or representative of this quantity. The difference between these quantities identifies the amount of energy that needs to be supplied to the energy storage cells 126 in order to return the energy storage cells 126 to full charge. The charging interface circuitry 128 can further monitor the quantity of energy provided to capacitive storage device 124, to determine when a suitable amount of energy has been provided to capacitive storage device 124 to fully charge energy storage cells 126.

For example, while the instrument 100 is in use, the output interface circuitry 156 identifies that a first quantity of energy has been output, which has partially depleted the energy storage cells 126. Once the instrument 100 is connected back to the charging station 106 (FIG. 1), the charging interface circuitry monitors the quantity of energy supplied to capacitive storage device 124. Once the quantity of energy equals or exceeds the first quantity of energy that was previously output, the charging interface circuitry can determine that the instrument 100 is fully charged, even if the entire first quantity has not yet been supplied to the energy storage cells 126 through the charging circuit 154. The energy will continue to be supplied from the capacitive storage device 124 to the energy storage cells 126 through the voltage boost circuitry 152 and the charging circuit 154 over time, even if the instrument 100 is removed from the charging station 106. This allows the instrument 100 to be returned to service more quickly than if the capacitive storage device 124 and/or the energy storage cells 126 are required to be fully charged before the instrument is determined to be fully charged.

Some embodiments further include a charge indicator 160, which provides an indication to the user of the current status of the charging. For example, the charge indicator may identify whether the electronic circuitry 122 is fully charged, partially charged, or depleted. The charge indicator 160 can include, for example, one or more LEDs, a digital display, a sound indicator, a vibratory indicator, or any other output device suitable for conveying charge status information to the user. One specific example of a charge indicator is a multi-bar LED array, including a set of LEDs arranged in a line. The LED at one end is used to represent a full charge, while the LED at the other end is used to represent a low charge, and each LED in-between is used to indicate a relative proportion of charge between low and full. Examples include five-bar or seven-bar LEDs, but other quantities of LEDs are used in other embodiments. In another embodiment, a multi-color LED is used, such as to generate a green output when the instrument 100 is fully charged, yellow when the instrument is in need of recharging, and red when the instrument is nearly or fully depleted. In some embodiments another color (e.g., blue) is used to indicate that the instrument 100 is being charged from an external power source, such as the charging station 106.

Figure 3:
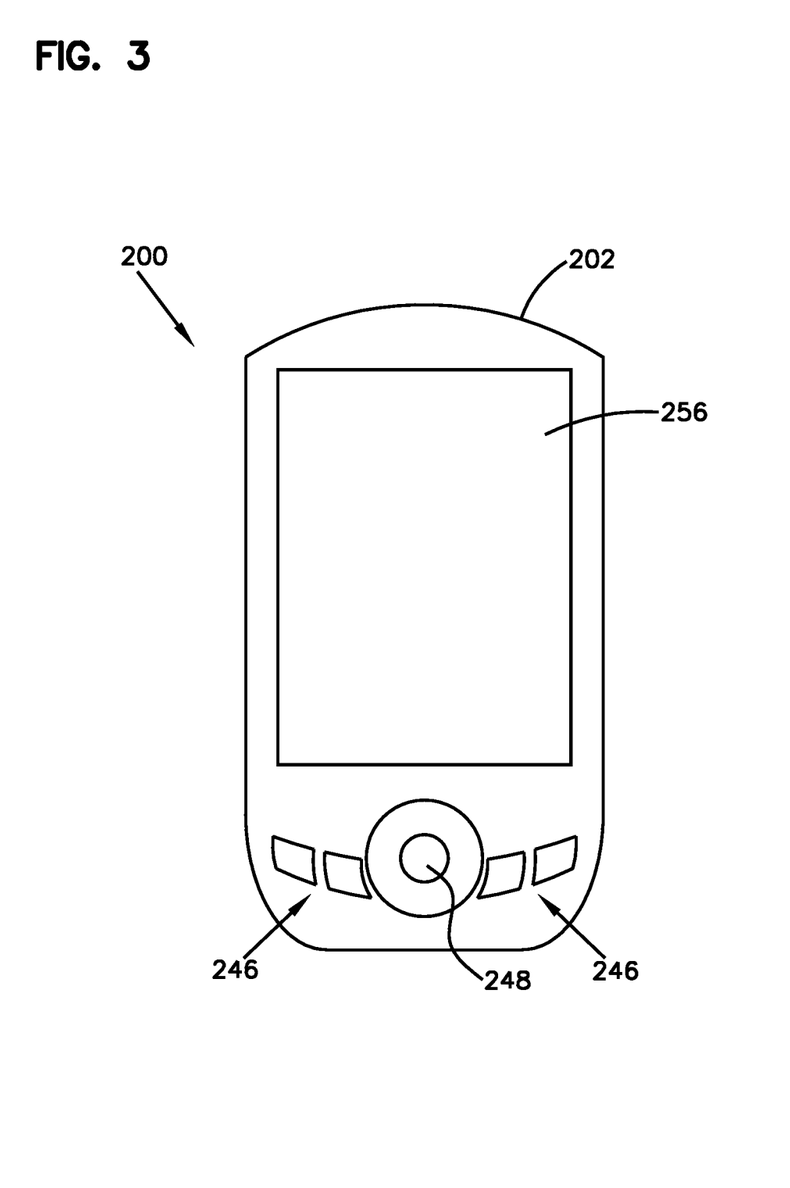
FIG. 3 is a front plan view of another example handheld device in the form of a mobile computing device.
Figure 4:
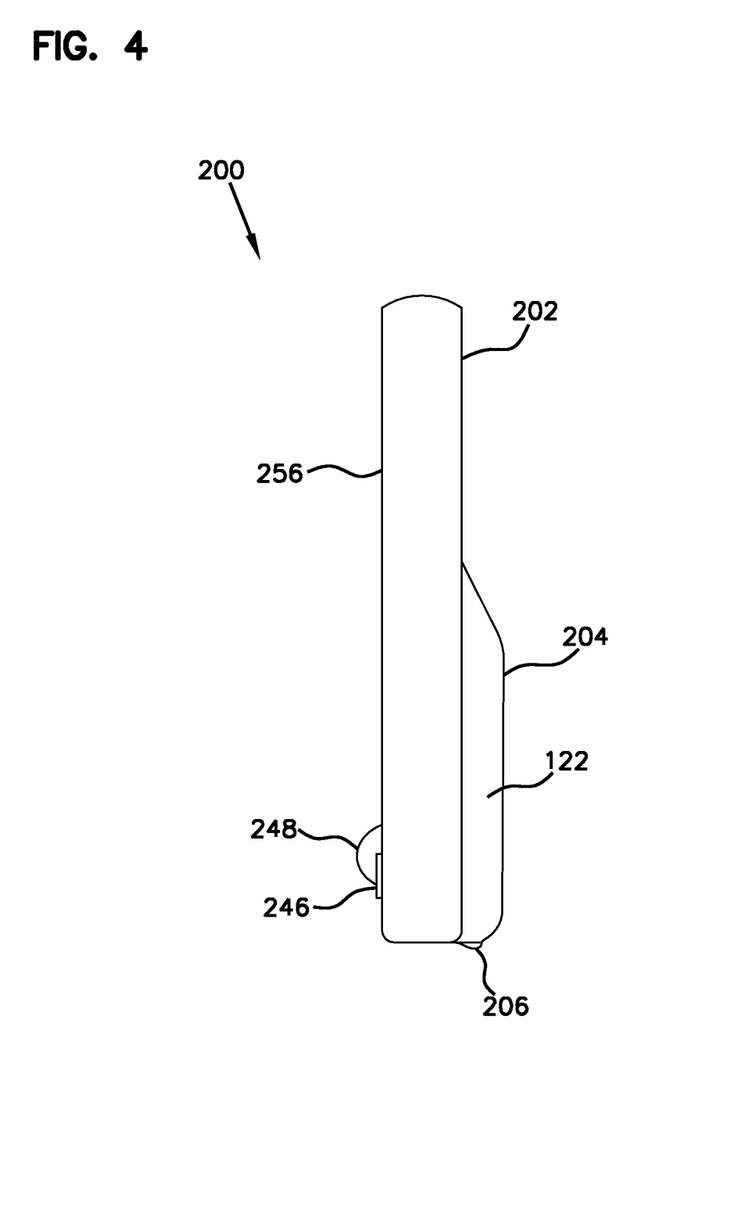
FIG. 4 is a side elevational view of the mobile computing device shown in FIG. 3.

FIGS. 3-5 illustrate another example of a handheld device in the form of a mobile computing device 200. FIG. 3 is a front plan view, FIG. 4 is a side elevational view, and FIG. 5 is a schematic block diagram of the mobile computing device.

In some embodiments, the mobile computing device 200 is a handheld device that includes at least a processing device and a memory device. Examples of mobile computing devices 200 include a personal digital assistant (PDA), a pager, a mobile phone, a Smartphone, a tablet computer, and a laptop computer. In some embodiments, the mobile computing device is a medical device. For example, some embodiments operate as a clinician notifier that provides alerts to a healthcare provider, such as a physician or a nurse, regarding the status of a patient.

In the example illustrated in FIGS. 3-5, the mobile computing device 200 includes a housing 202, a energy source pack 204 including electronic circuitry 122, and electrical contacts/port 206. Some embodiments further include input devices 244, such as input keys 246, and a pointer input device 248, and a display device 256. Some embodiments include additional components as illustrated and described in more detail with reference to FIG. 5.

Referring to FIG. 4, some embodiments include an energy source pack 204, which contains electronic circuitry 122. An example of electronic circuitry 122 is illustrated in FIG. 2. The energy source pack 204 can contain some or all of the components illustrated in FIG. 2, such as the charging interface circuitry 128, capacitive storage device 124, voltage boost circuitry 152, charging circuit 154, energy storage cells 126, and output interface circuitry 156.

In other embodiments, the electronic circuitry 122 is contained within the housing 202, and not within a separate energy source pack 204.

FIG. 5 illustrates an exemplary architecture of a mobile computing device 200. The computing device 200 includes, in some embodiments, at least one processing device 220, such as a central processing unit (CPU). A variety of processing devices are available from a variety of manufacturers, for example, Intel or Advanced Micro Devices. In this example, the computing device 200 also includes a system memory 222, and a system bus 224 that couples various system components including the system memory 222 to the processing device 220. The system bus 224 is one of any number of types of bus structures including a memory bus, or memory controller; a peripheral bus; and a local bus using any of a variety of bus architectures.

Examples of computing devices suitable for the computing device 200 include a desktop computer, a laptop computer, a tablet computer, a mobile device (such as a smart phone, an iPod® mobile digital device, or other mobile devices), or other devices configured to process digital instructions.

The system memory 222 includes read only memory 226 and random access memory 228. A basic input/output system 230 containing the basic routines that act to transfer information within computing device 200, such as during start up, is typically stored in the read only memory 226.

The computing device 200 also includes a secondary storage device 232 in some embodiments, such as a hard disk drive, for storing digital data. The secondary storage device 232 is connected to the system bus 224 by a secondary storage interface 234. The secondary storage devices and their associated computer readable media provide nonvolatile storage of computer readable instructions (including application programs and program modules), data structures, and other data for the computing device 200.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 232 or memory 222, including an operating system 236, one or more application programs 238, other program modules 240, and program data 242.

In some embodiments, computing device 200 includes input devices to enable a healthcare provider (or other user) to provide inputs to the computing device 200. Examples of input devices 244 include input keys 246, a pointer input device 248, a microphone 250, and a touch sensitive display device 256. Other embodiments include other input devices 244. The input devices 244 are often connected to the processing device 220 through an input/output interface 254 that is coupled to the system bus 224. These input devices 244 can be connected by any number of input/output interfaces, such as a parallel port, serial port, game port, or a universal serial bus. Wireless communication between input devices and interface 254 is possible as well, and includes infrared, BLUETOOTH® wireless technology, 802.11a/b/g/n, cellular, or other radio frequency communication systems in some possible embodiments.

In this example embodiment, a touch sensitive display device 256 is also connected to the system bus 224 via an interface, such as a video adapter 258. The touch sensitive display device 256 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide inputs.

In addition to the display device 256, the computing device 200 can include various other peripheral devices (not shown), such as speakers or a printer.

When used in a local area networking environment or a wide area networking environment (such as the Internet), the computing device 200 is typically connected to the network through a network interface, such as a wireless network interface 260. Other possible embodiments use other communication devices. For example, some embodiments of the computing device 200 include an Ethernet network interface, or a modem for communicating across the network.

The computing device 200 typically includes at least some form of computer-readable media. Computer readable media includes any available media that can be accessed by the computing device 200. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Mobile computing device 200 further includes electronic circuitry 122 coupled to a port or electrical contacts 206. An example of the electronic circuitry 122 is illustrated and described in with reference to FIG. 2.

Figure 6:
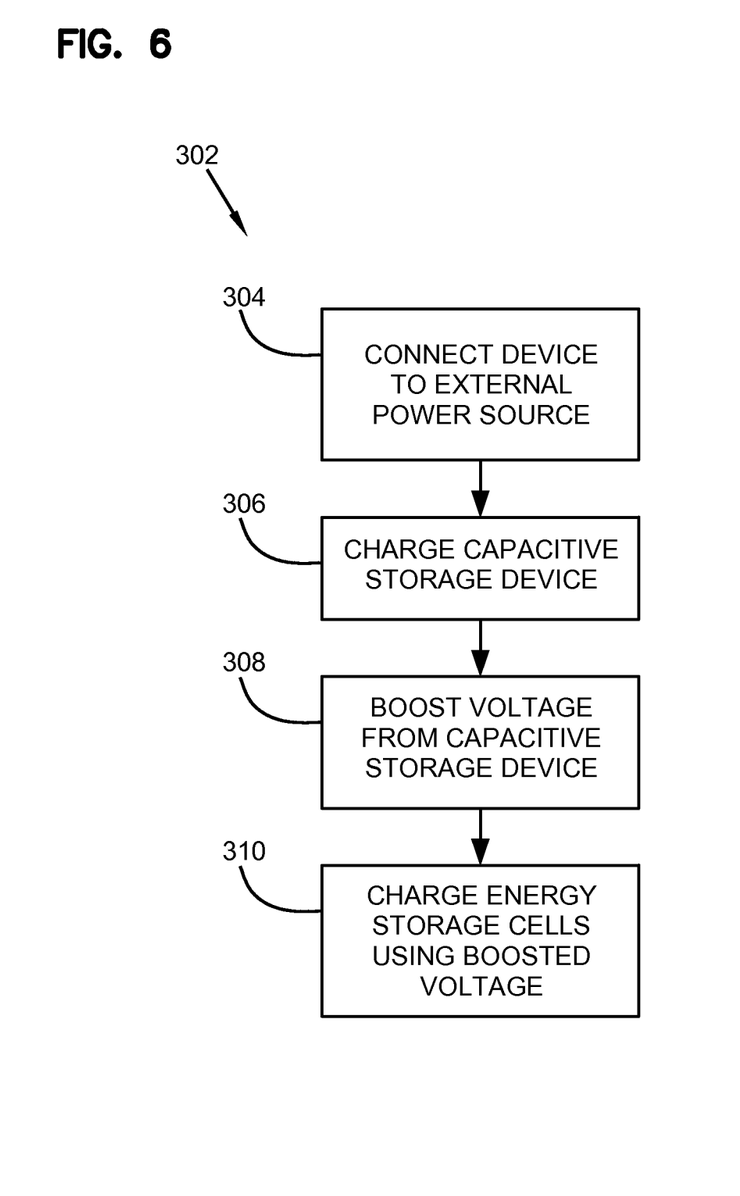
FIG. 6 is a flow chart illustrating an example method of recharging a handheld device.

FIG. 6 is a flow chart illustrating an example method 302 of recharging a handheld device. The example method 302 includes operations 304, 306, 308, and 310.

Operation 304 is performed to connect the device to an external power source. The operation may be performed, for example, when a charge status indicator of the device indicates that the device has a low battery. The device is then connected to the external power source. An example of the external power source is the charging station 106, shown in FIG. 1. The charging station 106 also receives power from an external power source, such as a wall receptacle, when a power cable is plugged into the wall receptacle. The external power source supplies power to the device through electrical contacts or another electrical transmission device.

The power received from the external power source is then used in operation 306 to charge a capacitive storage device, such as the capacitive storage device 124 shown in FIGS. 1 and 2. An example of the capacitive storage device 124 is a super capacitor. In some embodiments the charging of the capacitive storage device 124 occurs rapidly, such as in less than 120 seconds, less than 60 seconds, or less than 30 seconds. In some embodiments, recharging occurs in a range from about 30 seconds to about 5 minutes. Once fully charged, the device can be removed from the charging station, if desired. In addition, it is not required that the capacitive storage device be fully charged. Even a partial charge can be used to supply additional energy to the energy storage cells, to permit continued use of the device, in which case the capacitive storage device 124 can be partially charged even more quickly than the duration of time required to fully charge the capacitive storage device.

The voltage from the capacitive storage device is then boosted to a desired level in operation 308. The operation can be performed, for example, by voltage boost circuitry. The voltage boost circuitry compensates for the decreasing voltage from the capacitor, to supply a substantially constant output voltage.

Operation 310 is then performed to charge energy storage cells using the boosted voltage. For example, charging circuit 154 receives energy at a boosted voltage from the voltage boost circuit and supplies the energy in an appropriate form to the energy storage cells 126. In some embodiments charge circuitry manages the charging cycle of the energy storage cells to prevent or reduce the chance of damaging the energy storage cells 126 while they are being recharged. This typically involves supplying power to the energy storage cells 126 at a rate that is lower than the rate at which the capacitive storage device 124 can be charged, and so recharging of the energy storage cells 126 typically takes more time than charging of the capacitive storage device 124. However, since the capacitive storage device 124 stores a suitable amount of energy to recharge the energy storage cells, the device 100 can be removed from the charging station and may continue to be used while the recharging of the energy storage cells 126 is occurring.

In some embodiments, operations 308 and 310 are performed by a single circuit that simultaneously boosts voltage from the capacitive storage device and supplies the boosted voltage to the energy storage cells to charge the energy storage cells.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A handheld medical device comprising:
   an electrically powered device including a medical examination instrument;
   one or more energy storage cells configured to store energy and electrically coupled to the electrically powered device to supply energy to the electrically powered device;
   output interface circuitry electrically connected to the energy storage cells and to the electrically powered device to deliver energy from the energy storage cells to the electrically powered device and to power the electrically powered device from the energy storage cells;
   a capacitive storage device configured to receive and store energy from an external power source;
   boost circuitry configured to boost a voltage from the capacitive storage device;
   a charging circuit configured to receive energy having a boosted voltage and to recharge the storage cells using the energy having the boosted voltage; and
   charging interface circuitry electrically coupled to the capacitive storage device to receive energy from an external power source and to deliver the received energy to the capacitive storage device.

2. The device of claim 1, wherein the device is a handheld medical device.

3. The device of claim 1, wherein the device is a handheld computing device.

4. The device of claim 1, wherein the capacitive storage device includes at least one super capacitor.

5. The device of claim 1, further comprising:
   a housing; and
   wherein the charging interface circuitry includes electrical contacts configured to receive the energy from the external power source.

6. The device of claim 5, wherein the charging interface circuitry comprises a rectifier diode that allows power to be delivered from the electrical contacts to the capacitive storage device but substantially blocks power from being delivered from the capacitive storage device to the electrical contacts.

7. The device of claim 1, wherein the boost circuitry generates an output having a substantially constant voltage.

8. The device of claim 1, wherein the charging circuit comprises an application-specific integrated circuit programmed to supply energy to the energy storage cells according to predetermined criteria.

9. The device of claim 8, wherein one of the predetermined criteria is a predetermined maximum rate of power delivery, wherein the application-specific integrated circuit adjusts an actual rate of power delivery to maintain the actual rate below the predetermined maximum rate.

10. A method of charging energy storage cells of a medical examination instrument including an electrically powered device, the method comprising:
    connecting the medical examination instrument including an electrically powered device to an external power source to supply power;
    charging a capacitive storage device of the medical examination instrument using the power;
    boosting a voltage from the capacitive storage device;
    charging the energy storage cells using the boosted voltage; and
    powering the electrically powered device of the medical examination instrument from the energy storage cells.

11. The method of claim 10, wherein connecting the electrically powered device to an external power source comprises placing the electrically powered device in a charging station to connect electrical contacts of the electronic device to charging contacts of the charging station.

12. The method of claim 10, wherein connecting the electrically powered device to an external power source comprises connecting a power cable to a port of the electronic device.

13. The method of claim 10, wherein charging the capacitive storage device further comprises charging a super capacitor at a rate in a range from about 1 watt to about 100 watts.

14. The method of claim 13, wherein charging the capacitive storage device further comprises charging the super capacitor at a rate in a range from about 50 watts to about 60 watts.

15. The method of claim 10, wherein charging the capacitive storage device from a substantially depleted state to a fully charged state is performed in a range from about 30 seconds to about 5 minutes.

16. An electronic medical device comprising:
    one or more electronic devices requiring electrical power in order to perform one or more intended medical examination functions; and
    electronic power supply circuitry configured to store and to deliver the electrical power to the one or more electronic devices, wherein the electronic power supply circuitry comprises:
    charging interface circuitry including electrical contacts arranged and configured to receive energy from a charging station;
    a capacitive storage device comprising at least one capacitor electrically coupled to the charging interface circuitry to receive the energy from the charging interface when the charging interface is connected to the charging station;
    voltage boost circuitry electrically coupled to the capacitive storage device, and arranged and configured to generate an output having a substantially constant output;
    a charging circuit electrically coupled to the voltage boost circuitry to receive the output;
    energy storage cells electrically coupled to the charging circuit, wherein the charging circuit operates to recharge the energy storage cells using the energy stored in the capacitive storage device; and
    output interface circuitry electrically coupled to the energy storage cells to deliver energy from the energy storage cells to the one or more electronic devices.

17. The electronic device of claim 16, wherein the charging circuit comprises an application-specific integrated circuit.

18. The electronic device of claim 17, wherein the application-specific integrated circuit is programmed to manage a charge cycle of the energy storage cells.

* * * * *